June 9, 1931.     W. R. SMITH     1,809,734
TORQUE BALL RETAINER AND SPEEDOMETER
Filed Nov. 10, 1928     2 Sheets-Sheet 2

Inventor
William R. Smith
By Blackmore, Spencer & Hish
Attorneys

Patented June 9, 1931

1,809,734

UNITED STATES PATENT OFFICE

WILLIAM R. SMITH, OF TOLEDO, OHIO, ASSIGNOR TO GENERAL MOTORS CORPORATION, OF DETROIT, MICHIGAN, A CORPORATION OF DELAWARE

TORQUE BALL RETAINER AND SPEEDOMETER

Application filed November 10, 1928. Serial No. 318,568.

This invention relates to motor vehicles and particularly to a retainer for the ball shaped end of the torque tube or propeller shaft housing, and a speedometer drive associated therewith.

An object of the invention is to provide an improvement in the torque ball retainer which will facilitate assembly.

A further object is to provide for economy both in the cost of manufacturing and in the assembly of the parts.

A further object is to associate with a torque ball retainer an inexpensive and efficient speedometer drive mechanism, one which is easily assembled and disassembled, and one which is capable of use with gears of variable dimensions for use on vehicles differing as to the size of wheels, tires, etc. are used. Other objects and advantages will be apparent from the following description.

Figure 1:
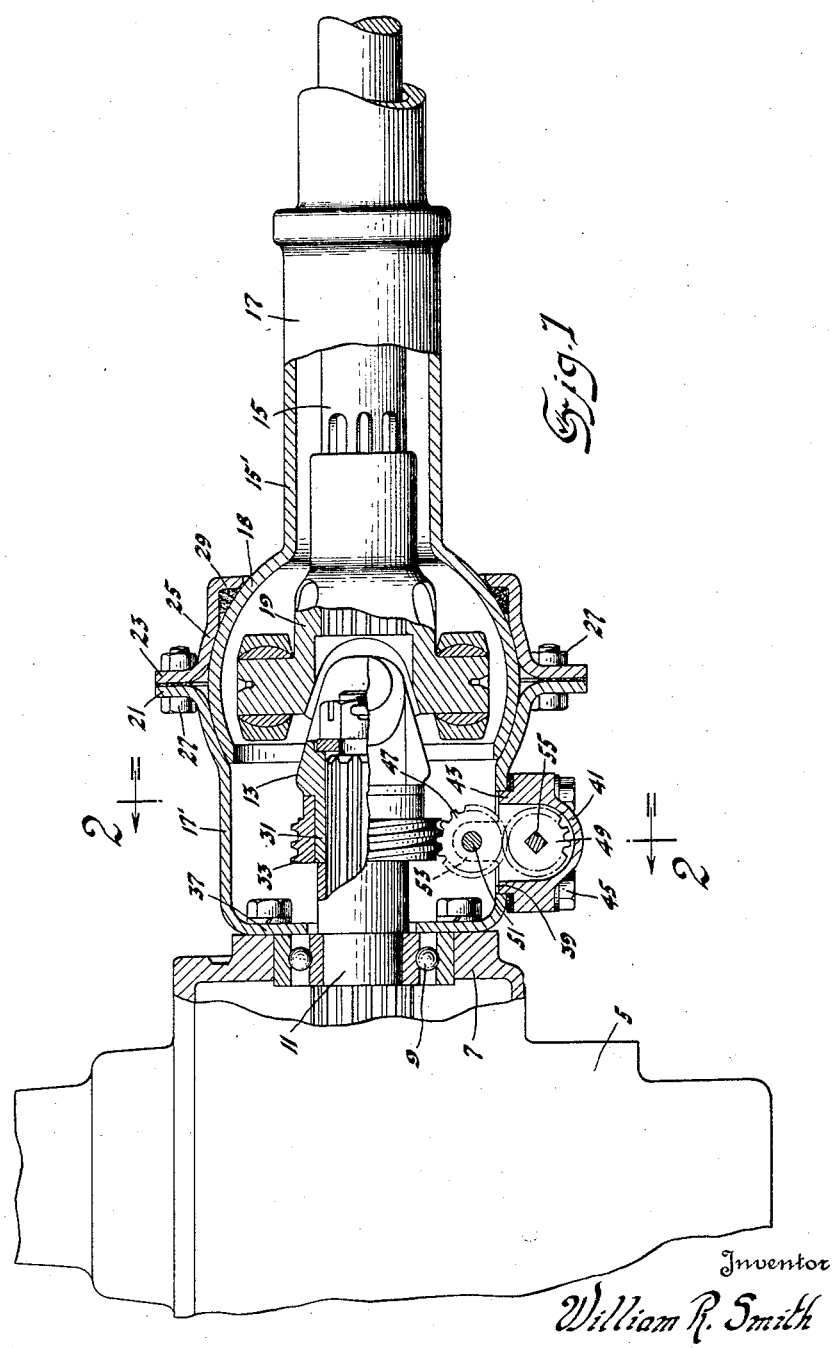
Figure 2:
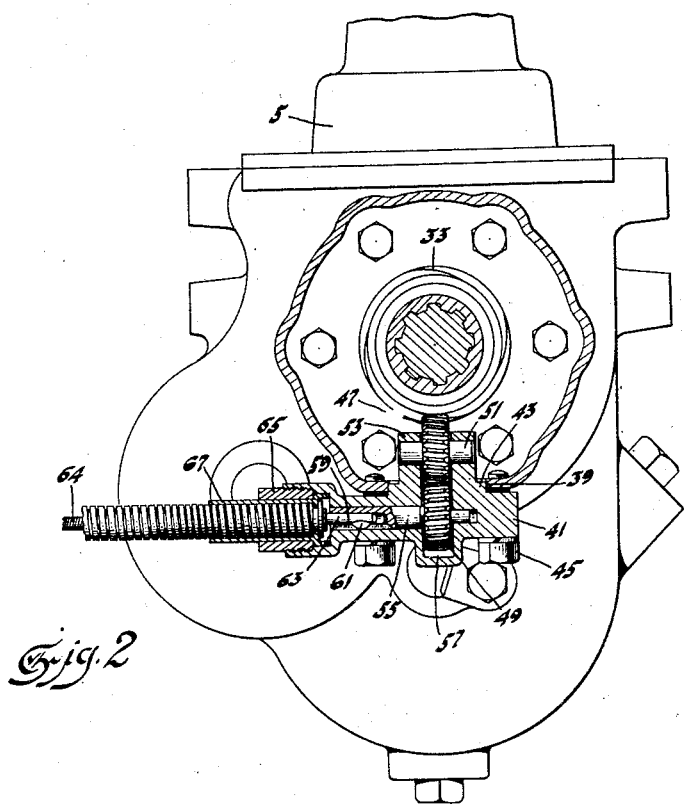
Figure 3:
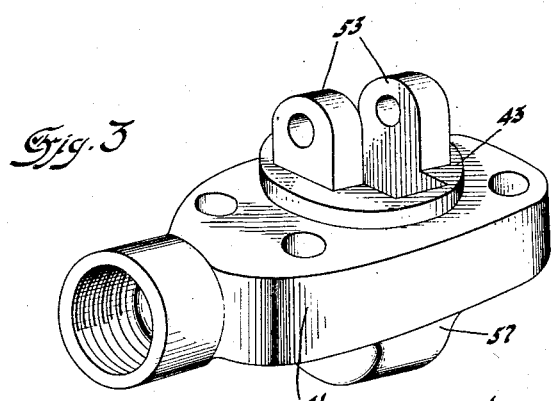

In the drawings, Fig. 1 is a vertical longitudinal section through the torque ball retainer and the universal joint at the rear of the transmission housing. Fig. 2 is a vertical section on line 2—2 of Fig. 1. Fig. 3 is a perspective of a die cast attachment for the speedometer drive.

Referring by reference characters to the drawings, numeral 5 represents a transmission housing of conventional or any desired form. The rear wall 7 of the housing has a bearing 9 for a shaft 11, this being the so-called spline shaft. To this shaft is secured the first element 13 of a universal joint. The propeller shaft 15 is inclosed in a housing 17 of conventional form, its front end being of spherical or ball shape as at 18 to enclose the universal joint between the spline shaft 11 and the propeller shaft 15. The rear element 19 of the joint is, as will be understood, secured to the front end of the propeller shaft 15. No novelty is being claimed for the universal joint per se and no further description of the joint need be given.

The propeller shaft housing 17 is very commonly rigidly connected to the rear axle housing in motor vehicle construction. The reaction of the drive upon the rear axle, tending to cause a rotation of the rear axle housing is in many constructions taken by this propeller shaft housing. For this reason the propeller shaft housing is frequently designated as a torque tube and the ball end 18 as the torque ball.

The housing for this ball end of the torque tube comprises a cup shaft part, one end being shaped to encircle the ball end of the torque tube and the other end having a flange commonly secured to the transmission housing. The spherical end of the housing 17' or torque ball retainer has an annular flange 21 co-operating with a like flange 23 on a collar 25, the flanges 21 and 23 being secured together by fastening means 27. Collar 25 is downturned at its end and is provided with packing 29 serving as a seal to prevent the entrance of dirt, dust or the like.

On shaft 11, or more correctly, on a hub part 31 of the joint member 13 is secured a gear 33 for driving another gear connected to the flexible speedometer shaft. In constructions of the above kind it is more common to cast the torque ball retainer of such form that there is a central opening at the end adjacent the transmission housing. From around this opening the ball retainer usually has on one side an outwardly directed flange for attachment to the transmission housing, and on the other side the retainer bulges outwardly into a spherical shape to receive the spherical end of the torque tube. In such constructions the only available place for fastening the ball retainer to the transmission housing is the flange. Since, however, the space between this flange and the bulge is limited, cap screws or the like cannot be used to effect the attachment of the ball retainer. It has therefore been common practice to employ studs in the transmission housing, which studs pass through openings in the retainer flange. Nuts are then inserted in the space between the flange and the bulge and turned upon the ends of the studs. Because of the limited space between the bulge part and the flange it has been necessary to use laterally entering tools to turn these nuts. This renders the attachment of the parts slow and consequently expensive.

In the present construction the ball retainer is shaped differently and as shown in the drawings. Its end adjacent the transmission housing has an inwardly (not outwardly) directed flange 37 and the retainer itself is so shaped that suitable tools may be passed into the retainer through the spherical shaped opening to engage the fastening means, which may obviously be simple cap screws. To render this operation possible it is only necessary to make the ball retainer of such dimensions as to permit the insertion of the tool directly to the end of the screws. In other words the minimum radial dimension of the retainer should be at least a little greater than the radial distance of the cap screws.

Furthermore, a retainer of this shape is well adapted to the process of stamping and the drawing is intended to illustrate such a retainer.

As stated above it is common practice to take the speedometer drive from within the torque ball retainer. This is frequently done by providing bearing openings in the wall of the cast ball retainer and mounting a shaft in said bearings. A gear on said shaft within the retainer meshes with a gear on the spline shaft. The flexible speedometer shaft can thus be driven. In the case of the stamped torque ball retainer I find it especially expedient to secure over an opening 39 therein a die cast gear carrier 41. This gear carrier has a circular portion 43 which is designed to be received in the opening 39 and to aid in holding the carrier in position. The carrier 41 is further secured in position by bolts or other fastening means 45. The carrier 41 is provided with two meshing gears 47 and 49. Gear 47 is mounted on shaft 51 by the arms 53 extending from the carrier into the ball retainer 17′. This gear 47 meshes with gear 33 on the spline shaft. Gear 49 is carried on shaft 55 journalled in bearing openings provided in the carrier and positioned on either side of a gear pocket 57. One end of said shaft and the bearing opening may be of reduced dimensions as shown. The other end is as usual formed with a central bore and a slot 59 and is in engagement with a key 61 on the tip 63 carried by the end of the flexible speedometer cable 64. The carrier member 41 may have an end threaded as shown in Fig. 3 to receive a nut 65 to which is secured the end of housing 67 for the flexible drive shaft of the speedometer cable. The attaching element for the speedometer cable forms no part of the present invention.

The drawings show shims between the carrier and the ball retainer. By the use of shims it is possible to substitute other gears for gears 47 and 49 whereby different ratios may be obtained. The purpose of such substitution is to make correction for changes in sizes of wheels or tires or driving ratios. When such changes are made the diameter of gear 47 will obviously be changed and a new center distance with reference to gear 33 must be provided for. The shims associated with the fastening means between the carrier and the retainer are intended to effect such changed position of the gears. There is thus provided an extremely simple means for changing the speedometer drive gears, it being only necessary to substitute gears for gears 47 and 49, and to use such a number of shims as is necessary to make a correct meshing engagement between gear 33 and the substitute for gear 47.

It will be understood that this arrangement for driving the speedometer may be used regardless of the way in which the ball retainer is made but that it is of special utility in connection with the stamped type of ball retainer. The provision of the two gears in the carrier instead of one is made because of the relatively larger size of retainer, the large size being provided as explained above to permit the use of cap screws concealed within the retainer in place of fastening means outside the retainer as has been done heretofore.

I claim:

1. A hollow torque ball retainer having at one end an inwardly directed flange, internally located fastening means to secure said flange to said gear housing, said ball retainer being throughout its length radially greater than the radial distance of said fastening means, means to drive a measuring instrument associated with said ball retainer comprising a carrier, meshing gears mounted in said carrier, one of said gears to engage a gear on the spline shaft of the transmission, the other to operate a speedometer shaft, means to secure said carrier in adjusted position, relative to said ball retainer to permit interchange of gears.

2. A hollow torque ball retainer having at one end an inwardly directed flange, internally located fastening means to secure said flange to said gear housing, said ball retainer being throughout its length radially greater than the radial distance of said fastening means, means to drive a measuring instrument associated with said ball retainer comprising a carrier, meshing gears mounted in said carrier, one of said gears to engage a gear on the spline shaft of the transmission, the other to operate a speedometer shaft, means including shims to secure said carrier in adjusted position, relative to said ball retainer to permit interchange of gears.

In testimony whereof I affix my signature.

WILLIAM R. SMITH.